United States Patent
Rivers, Jr. et al.

(10) Patent No.: US 8,358,102 B2
(45) Date of Patent: *Jan. 22, 2013

(54) SYSTEM, CHARGING DEVICE, AND METHOD OF CHARGING A POWER STORAGE DEVICE

(75) Inventors: Cecil Rivers, Jr., Hartford, CT (US); Radoslaw Narel, Berlin, CT (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,303

(22) Filed: Oct. 21, 2011

(65) Prior Publication Data

US 2012/0126743 A1    May 24, 2012

(51) Int. Cl.
*H02J 7/00* (2006.01)
(52) U.S. Cl. ......... 320/107; 320/109; 320/113; 320/115
(58) Field of Classification Search .................. 320/106, 320/109, 113, 115
See application file for complete search history.

(56) References Cited

U.S. PATENT DOCUMENTS

| | | | | |
|---|---|---|---|---|
| 5,327,066 | A * | 7/1994 | Smith | 320/109 |
| 5,684,379 | A | 11/1997 | Svedoff | |
| 7,135,956 | B2 | 11/2006 | Bartone et al. | |
| 2009/0261779 | A1 * | 10/2009 | Zyren | 320/109 |
| 2010/0066170 | A1 | 3/2010 | Schuler | |
| 2010/0114387 | A1 | 5/2010 | Chassin | |
| 2010/0141204 | A1 | 6/2010 | Tyler et al. | |
| 2010/0198440 | A1 | 8/2010 | Fujitake | |
| 2010/0274656 | A1 | 10/2010 | Genschel et al. | |
| 2011/0007824 | A1 | 1/2011 | Bridges et al. | |
| 2011/0029144 | A1 | 2/2011 | Muller | |
| 2011/0043165 | A1 | 2/2011 | Kinser et al. | |

FOREIGN PATENT DOCUMENTS

| | | |
|---|---|---|
| WO | 2011031801 A1 | 3/2001 |
| WO | 2010120551 A1 | 10/2010 |

OTHER PUBLICATIONS

Kabisch, S.; Schmitt, A.; Winter, M.; Heuer, J. "Interconnections and Communications of Electric Vehicles and Smart Grids," Oct. 4-6, 2010, pp. 161-166.

* cited by examiner

*Primary Examiner* — Samuel Berhanu
(74) *Attorney, Agent, or Firm* — Global Patent Operation; Stephen G. Midgley

(57) ABSTRACT

A system for use in supplying current to a plurality of power storage devices includes a first charging device configured to supply current to a first power storage device. At least one other charging device is coupled to the first charging device to form a network and is configured to supply current to at least one other power storage device of the plurality of power storage devices. When the first charging device possesses a network token, it determines a second charging parameter associated with said second charging device, and a second amount of current to be at least one of received from the electrical supply or supplied to the first power storage device, based at least in part on said determined first and second charging parameters.

19 Claims, 5 Drawing Sheets

SYSTEM, CHARGING DEVICE, AND METHOD OF CHARGING A POWER STORAGE DEVICE

BACKGROUND OF THE INVENTION

The present application relates generally to charging devices and, more particularly, to a system, a charging device, and a method of supplying current to a power storage device.

As electric vehicles and/or hybrid electric vehicles have gained popularity, an associated need to manage delivery of electrical energy to such vehicles has increased. In addition, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable.

In at least some electric utility distribution networks, a plurality of charging devices receive electricity from a common electrical distribution component, such as a transformer. However, if each charging device operates concurrently to supply charging current to an electric vehicle, the current supplied to the electrical distribution component may exceed a rated current limit of the component. In such situations, the electrical distribution component may be damaged and/or a circuit breaker or another protection device may activate to disable power to all charging devices coupled to the electrical distribution component.

At least some known electric vehicle (EV) charging stations or other electric vehicle supply equipment (EVSE) employ a dedicated master control to manage current draw from a group of EVSEs that are connected to the same electrical supply such as a utility distribution network, and are protected by the same overcurrent protection such as main breaker.

Such a conventional master controller or device is typically employed to monitor and control the maximum amount of current an EV charger or EVSE can provide to a vehicle based on the electrical supply the EVSE is connected to.

When some conventional electric utility distribution networks are connected to a plurality of EVSE chargers, particularly when those EVSE chargers are functioning to provide charging currents at or near their maximum ratings, the networks are not able to support all the chargers. For example, if the group of EVSE chargers exceeds the a predetermined current limit for the distribution network, circuit protection devices in the network may trip or open to shut off current flow to the EVSE chargers resulting in no vehicles being charged.

BRIEF DESCRIPTION OF THE INVENTION

Embodiments include systems, devices, and methods for use in supplying current to a plurality of power storage devices without need of a dedicated master device. Embodiments include a first charging device configured to supply current to a first power storage device of the plurality of power storage devices. Embodiments also include at least a second charging device coupled to the first charging device to form a network. The second charging device is configured to supply current to at least one other power storage device of the plurality of power storage devices. The first charging device includes a processor programmed to determine whether the first charging device possesses a network token, and if so, to determine a second charging parameter associated with the second charging device, determine a second amount of current to be at least one of received from the electrical supply or supplied to the first power storage device, based at least in part on the determined first and second charging parameters.

BRIEF DESCRIPTION OF THE DRAWINGS

Reference is now made briefly to the accompanying drawings, in which.

DETAILED DESCRIPTION OF THE INVENTION

In some embodiments, the term "electric vehicle" refers generally to a vehicle that includes one or more electric motors. Energy used to power the motors may come from various sources, such as, but not limited to, an on-board rechargeable battery and/or an on-board fuel cell. In one embodiment, the electric vehicle is a hybrid electric vehicle, which captures and stores energy generated, for example, by braking. A hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
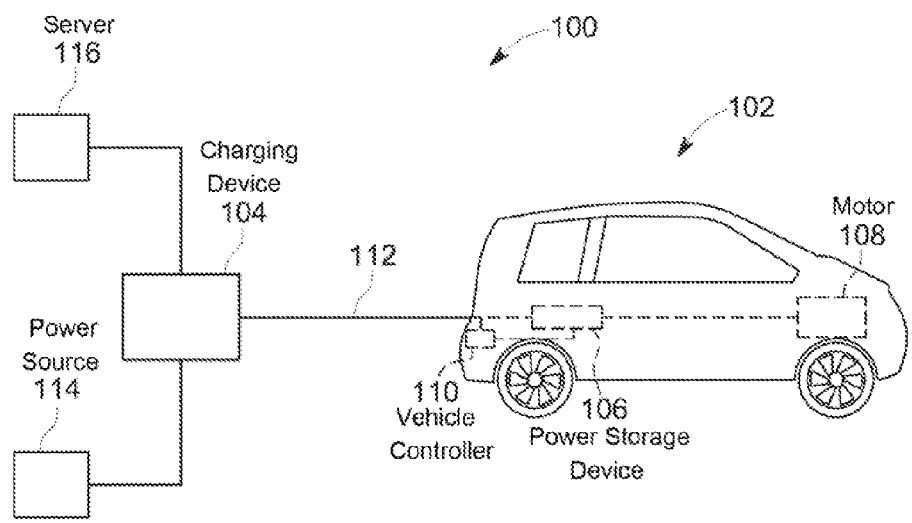
FIG. 1 is a block diagram of an exemplary system for charging an electric vehicle.

FIG. 1 illustrates an exemplary system 100 for use in charging, or providing electricity to an electric vehicle 102. In an exemplary embodiment, system 100 includes a charging device 104 coupled to electric vehicle 102. In an embodiment, electric vehicle 102 includes at least one power storage device 106, such as a battery and/or any other storage device, coupled to a motor 108. In an exemplary embodiment, electric vehicle 102 also includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In an exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. In an exemplary embodiment, charging device 104 is coupled to an electric power source 114, such as a power grid of an electric utility company, a generator, a battery, and/or any other device or system that provides electricity to charging device 104.

In an exemplary embodiment, charging device 104 is coupled to at least one server 116 through a network, such as the Internet, a local area network (LAN), a wide area network (WAN), and/or any other network or data connection that enables charging device 104 to function as described herein.

Server 116, in an exemplary embodiment, communicates with charging device 104, for example, by transmitting a signal to charging device 104, for example to authorize payment and/or delivery of electricity to power storage device 106, to access customer information, and/or to perform any other function that enables system 100 to function as described herein.

In an exemplary embodiment, server 116 and vehicle controller 110 may each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, in an exemplary embodiment, a user couples the power storage device 106 of the vehicle to the charging device 104 using the power conduit 112. In one embodiment, the power conduit 112 is a cable having a connector at one end that removably and electrically couples with a corresponding connector of the charging device 104.

The user may access a user interface device (not shown in FIG. 1) of charging device 104 to enter information, such as payment information, and/or to initiate power delivery to power storage device 106. The charging device 104 is configured to communicate with server 116, for example, to authenticate the user, to process the payment information, and/or to approve or authorize the power delivery. If the charging device 104 receives a signal from server 116 that indicates approval or authorization to deliver power to the power storage device 106, the charging device 104 receives power from electric power source 114 and provides the power to power storage device 106 through power conduit 112. The charging device 104 communicates with the vehicle controller 110 wirelessly, through the power conduit 112, and/or through any other conduit, to control and/or to monitor the delivery of power to the power storage device 106. For example, the vehicle controller 110 transmits signals to the charging device 104 indicating a charge level of the power storage device 106 and/or a desired amount and/or rate of electricity, such as a maximum current level to be provided by the charging device 104. In addition, the charging device 104 transmits signals to the vehicle controller 110 indicating an amount and/or rate of electricity being delivered to the power storage device 106. Additionally or alternatively, the charging device 104 and/or the vehicle controller 110 may transmit and/or receive any other signals or messages that enable the system 100 to function as described herein. When the power storage device 106 has been charged to a desired level, the charging device 104 ceases delivering power to the power storage device 106 and the user may disengage the power conduit 112 from the power storage device 106.

Figure 2:
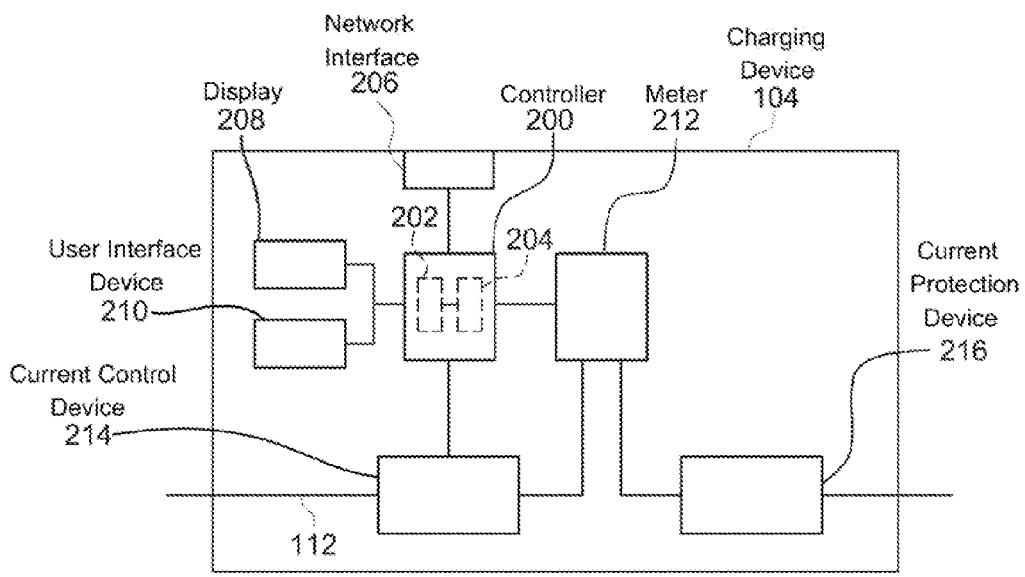
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that comprises a processor 202 and a memory device 204. As described more fully herein, controller 200 is coupled to a network interface 206, to a display 208, to a user interface device 210, to a meter 212, and to a current control device 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 204 includes a non-transitory computer readable medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system. In an exemplary embodiment, network interface 206 is communicatively coupled to at least one other charging device 104 such that charging devices 104 transmit and receive data to and from each other. In an exemplary embodiment, network interface 206 is coupled to a network interface 206 of at least one other charging device 104 using any suitable data conduit, such as an Ethernet cable, a Recommended Standard (RS) 485 compliant cable, and/or any other data conduit that enables charging device 104 to function as described herein. Alternatively, network interface 206 communicates wirelessly with a network interface 206 of at least one other charging device 104 using any suitable wireless protocol.

In an exemplary embodiment, display 208 includes a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In an exemplary embodiment, a charging status of power storage device 106 (shown in FIG. 1), payment information, user authentication information, and/or any other information may be displayed to a user on display 208.

User interface device 210 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into charging device 104 and/or to retrieve data from charging device 104. In an exemplary embodiment, the user may operate user interface device 210 to initiate and/or terminate the delivery of power to power storage device 106. In one embodiment, the user may input user authentication information and/or payment information using user interface device 210.

In an exemplary embodiment, current control device 214 is coupled to power conduit 112 and to meter 212. In an exemplary embodiment, current control device 214 is a contactor 214 coupled to, and controlled by, controller 200. In an exemplary embodiment, controller 200 operates, or opens contactor 214 to interrupt the current flowing through power conduit 112 such that power storage device 106 is electrically disconnected from electric power source 114 (shown in FIG. 1). Controller 200 also closes contactor 214 to enable current to flow through power conduit 112 such that power storage device 106 is electrically connected to electric power source 114.

Meter 212 is coupled to power conduit 112 and to controller 200 for use in measuring and/or calculating the current, voltage, and/or power provided from electric power source 114 to power storage device 106. Meter 212 transmits data representative of the measured current, voltage, and/or power to controller 200.

In an exemplary embodiment, a current protection device 216 is coupled to meter 212 and to electric power source 114. The current protection device 216 electrically isolates or disconnects charging device 104 from the electric power source 114 (FIG. 1) if the current received from the electric power source 114 exceeds a predetermined threshold or current limit. In an exemplary embodiment, current protection device 216 is a circuit breaker. Alternatively, current protection device 216 may be a fuse, a relay, and/or any other device that enables current protection device 216 to function as described herein.

In an exemplary embodiment, memory device 204 is configured to store an identification number (ID) of the corresponding charging device 104. For example, the ID may be a Media Access Control (MAC) address, Internet Protocol (IP) address, a user-assigned unique identifier, or any other convenient ID).

Figure 3:
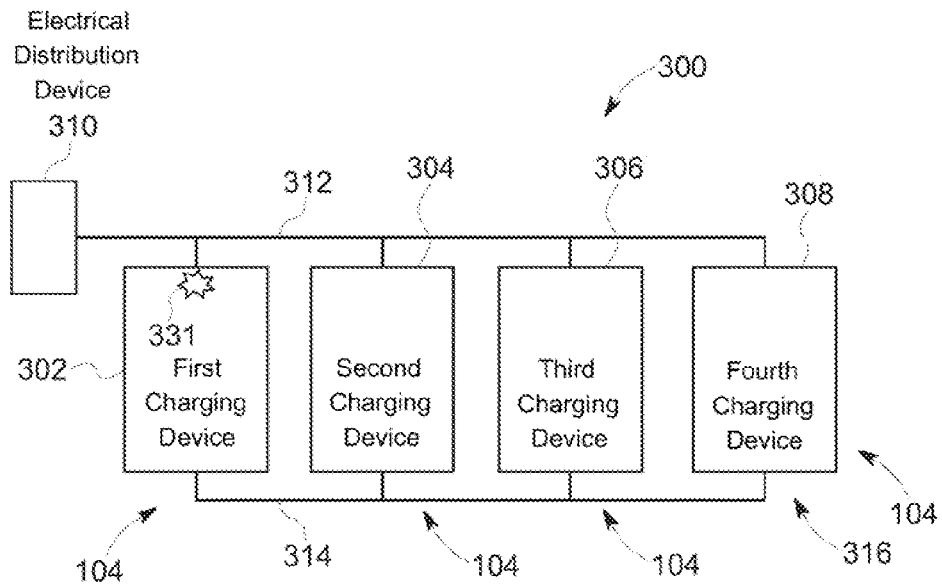
FIG. 3 is a block diagram of an exemplary charging system for charging a plurality of electric vehicles that may be used with the system shown in FIG. 1.

In an exemplary embodiment, memory device 204 is additionally configured to store data indicative of any number of charging parameters. The charging parameters may include any desired parameters. Examples of charging parameters may include, without limitation, a maximum desired current level (for example, an amount and/or rate of current requested by a vehicle controller 110); a maximum current setting (for example, a maximum current the charging device 104 may provide to power storage device 106); a supply current (for example, an amount and/or rate of current supplied by charging device 104 to power storage device 106); a current usage, (for example, the present current level or rate drawn by the charging device 104 from electrical distribution device 310). a charging duration (for example, a duration charging device 104 has been charging power storage device 106); and a charging status (for example, whether charging device 104 is presently charging power storage device 106). In an embodiment, the stored charging parameters in memory device 204 also includes charging parameter data related to or received from other charging devices 104 in a network 316 (FIG. 3). In another exemplary embodiment, the stored charging parameters in memory device 204 also include a current threshold for the network 316 (for example, a predetermined threshold or current distribution limit of the electric power source 114.

In an exemplary embodiment, memory device 204 is additionally configured to store charging parameter data to be used to determine a conditional priority assigned the charging device 104. The conditional priority data may include, without limitation, the charging parameters of a charging device 104, and/or an identity of a user. In an embodiment, the conditional priority of a charging device 104 is determined based on predetermined conditions or rules. For example, if a first charging device 104 in the network 316 (FIG. 3) is currently a first charging power storage device 106, and the first charging device 104 has a long charge duration, the first charging device 104 may be assigned a higher priority than a second charging device 104 in network 316 having a shorter charge duration. In another example, a first charging device 104 operated by a first predetermined user may be assigned a higher priority than another charging device 104 in the network 316 (FIG. 3) operated by a second user, based on predetermined priority rules for the network 316.

During operation, power storage device 106 of electric vehicle 102 is coupled to charging device 104 using power conduit 112. In one embodiment, a user obtains authorization from server 116 and/or another system or device to enable charging device 104 to charge (i.e., to provide electrical current to) power storage device 106. As described more fully herein, charging device 104 determines an amount or rate of current to provide to power storage device 106 based on predetermined parameters. For example, in various embodiments, the predetermined parameters may comprise the stored charging parameters in memory 204 such as, for example without limitation, the number of charging devices 104 within the network, the total current usage of the charging devices 104 in network 316, the supply current and/or the current usage of one or more charging devices 104 on the network 316, the desired maximum current level of one or more power storage devices 106 coupled to the network 316, the current distribution limit of the electrical distribution device 114 that charging devices 104 are coupled to, or a conditional priority of one or more charging devices 104 on the network 316.

FIG. 3 is a block diagram of an exemplary charging system 300 that may be used to charge a plurality of electric vehicles 102, such as by charging a power storage device 106 (both shown in FIG. 2) of each electric vehicle 102. In an exemplary embodiment, charging system 300 includes a plurality of charging devices 104, such as a first charging device 302, a second charging device 304, a third charging device 306, and a fourth charging device 308. While FIG. 3 illustrates four charging devices 104, charging system 300 may include any number of charging devices 104 as desired.

In an exemplary embodiment, charging devices 104 are coupled to a common electrical distribution device 310 through respective power conduits 312. In an exemplary embodiment, electrical distribution device 310 is a transformer 310 that adjusts a distribution voltage received from electric power source 114 to a voltage suitable for use with charging devices 104. Alternatively, electrical distribution device 310 may be any other device that enables charging system 300 to function as described herein. In an exemplary embodiment, electrical distribution device 310 distributes current to each charging device 104 until the distributed current reaches a current distribution limit of electrical distribution device 310. For example, electrical distribution device 310 may be designed or "rated" to distribute a predefined amount of current. Accordingly, the current distribution limit may be set to the predefined amount of current or a current level below the predefined amount. As described more fully herein, in an embodiment, each charging device 104 determines an amount or rate of current to draw from electrical distribution device 310 based on predetermined parameters. For example, the amount or rate of current for charging device 104 to draw from electrical distribution device 310 may be determined in various embodiments as a function of the current distribution limit, the amount of current being drawn from other charging devices 104, and/or the number of charging devices 104 within a network. Alternatively, charging devices 104 are coupled to a plurality of electrical distribution devices 310 and each charging device 104 determines the amount of current to supply to power storage device 106 based on predetermined parameters, for example, as a function of the current distribution limits of electrical distribution devices 310, the amount of current drawn from other charging devices 104, and/or the number of charging devices 104 within one or more networks.

Charging devices 104, in an exemplary embodiment, are coupled together in data communication by a data bus 314. More specifically, charging devices 104 are coupled to data bus 314 by respective network interfaces 206 (FIG. 2). In an exemplary embodiment, data bus 314 includes at least one data conduit (not shown), such as an Ethernet cable, a Recommended Standard (RS) 485 compliant cable, and/or any other data conduit that enables data bus 314 to function as described herein. Alternatively, charging devices 104 are coupled together in data communication by a wireless network. In an exemplary embodiment, charging devices 104 and/or data bus 314 form a peer-to-peer type network 316 that enables each charging device 104 to exchange data with other charging devices 104 coupled to network 316 without requiring a master controller. Alternatively, charging devices 104 and/or data bus 314 may form any other network that enables charging system 300 to function as described herein. While FIG. 3 depicts a token-ring type communication network 316 having a ring topology, it is contemplated that any desired network topology may be employed, such as ring with a hub, star, mesh, tree, or any other topology capable of executing the functions described herein.

With reference to FIGS. 2 and 3, in an exemplary embodiment, the memory device 204 of each charging device 104 in the network 316 is also configured to receive and store an identification number (ID) of the remaining charging devices 104 in the network 316. In an exemplary embodiment, each charging device 104 transmits at least one request to each other charging device 104 to receive data regarding the identification number (ID) of each other charging device 104. During operation, each charging device 104 in the network 316 may communicate the ID stored in its respective memory device 204 to each of the remaining charging devices 104 in the network 316.

Alternatively, each charging device may receive data regarding the identification number (ID) from another source, such as from a remote computer (not shown), from a subset of charging devices 104 coupled to network 316, and/or from any other source that enables charging system 300 to function as described herein.

During operation, control of a network token 331 is determined. In an embodiment, a contention procedure is initiated wherein a first charging device 302 negotiates with a second charging device 304 and any other charging devices 306, 308 on the network 316 for the control of the network 316. For example, the charging device 104 with the highest ID is designated as the present active device, while the remaining charging devices are designated as standby devices. In an exemplary embodiment, the charging device 104 designated as the present active device generates the network token 331. In another embodiment, the token 331 is generated and provided to the charging device 104 currently which is then designated as the active device. In an embodiment, the charging device 104 currently in possession of the network token 331 is designated as the present active device, while the remaining charging devices 104 are designated as present standby devices.

After a predetermined period, the network token 331 is then passed from the charging device 104 designated as the present active device to a next charging device 104 in the network 316 based on predetermined parameters. In an exemplary embodiment, the next charging device 104 is the charging device having a next lowest ID from the present active device. Upon receipt of the token 331, the next charging device 104 receiving the token 331 is then in turn designated as the present active device, and the remaining charging devices 104 are designated as present standby devices. The token 331 likewise continues to be passed in turn to each of the charging devices 104 in the network 316. It will be understood that while FIG. 3 depicts charging device 302 as possessing the network token 331, in operation and as described herein, the network token may be possessed by any one of the charging devices 104, and by only one charging device 104 at any one time.

In an embodiment, each charging device 104 is configured to transmit a charging parameter data request to the remaining charging devices 104 on the network 316, only when the charging device 104 is in possession of the network token 331. In this way, data collisions on network 316 can be avoided. In an embodiment, possession of the network token 331 allows the charging device designated as the present active device 104 to request charging parameter data from the remaining charging devices 104 on the network 316. Possession of the network token 331 also allows the charging device 104 to change any predetermined parameters, such as the maximum current setting (for example, a maximum current the charging device 104 may provide to power storage device 106) or the present current usage of charging device 104 (for example, the present current level or rate drawn by the charging device 104 from electrical distribution device 310).

As described more fully herein, in an exemplary embodiment, controller 200 of first charging device 302 is configured to determine whether the device 302 is in possession of the network token 331. When possession of the network token 331 is determined, the controller 200 of first charging device 302 transmits at least one request to at least a second charging device 304 to receive at least a first charging parameter, such as for example without limitation, data regarding the supply current, expected supply current, current usage, expected current usage, and conditional priority of at least the second charging device 302. As used herein, the term "supply current" refers generally to an amount or rate of current supplied or expected to be supplied by a charging device 104. As used herein, the term "current usage" refers generally to an amount or rate of current drawn or expected to be drawn by at least one charging device 104 from electrical distribution device 310.

Controller 200 of each charging device 104 is configured to allow the transmission of a request for charging parameters of another charging device 104 only when the charging device 104 making the request for charging parameters possesses the network token 331. Each charging device 104 that receives the request for charging parameters from first charging device 302 responds by transmitting charging parameter data to first charging device 302. In one embodiment, only charging devices 104 that are supplying current or that are expecting to supply current respond to the charging parameter data request. In another embodiment, only charging devices 104 that are receiving or are expecting to receive current from electrical distribution device 310 respond to the charging parameter data request. First charging device 302 receives

511b charging parameter data from each other charging device 104 within network 316 and stores the data in memory 204.

Alternatively, each charging device 104 may receive charging parameter data (such as supply current or current usage), from another source, such as from a remote computer (not shown), from a subset of charging devices 104 coupled to network 316, and/or from any other source that enables charging system 300 to function as described herein.

In operation, the controller 200 of each charging device 104 on the network 316 determines its present charging parameters, such as for example, current usage, supply current, maximum current level, and maximum current setting. The active charging device 104 also determines predetermined charging parameters, such as for example the current usage, supply current, maximum current level, or maximum current setting of the remaining charging devices 104. The active charging device 104 transmits a request for the charging parameter data of the remaining charging devices 104 on the network 316. The active charging device 104 subsequently receives the charging parameter data of the remaining charging devices 104 on the network 316, and may store the received charging parameter data in memory 204.

The active charging device 302 also determines network charging parameter data such as without limitation, a current threshold of the network, number of charging devices connected to network 316, or any other desired parameter. For example, in an embodiment, active charging device 302 determines the current threshold of the network 316, and thereafter determines whether the current threshold for the network is exceeded. In an embodiment, network charging parameter data may be stored in memory 204.

In an embodiment, the presently designated active charging device 104, determines if it should change any of its charging parameters based on predetermined parameters such as the determined charging parameters of the remaining charging devices 104 stored in memory 204.

In another exemplary embodiment, a first charging device 302 presently designated active charging device, determines if it should change any of its charging parameters, such as maximum current setting, based on a determined or assigned conditional priority. For example, a first charging device 302 being assigned a lower conditional priority may be configured to decrease its maximum current level before a second charging device 304 being assigned a higher priority. Only after a first charging device 302 with a lower assigned priority has lowered its maximum current level to a predetermined minimum amount, will a second charging device 304 with a higher assigned priority be required to lower its maximum current level. Alternatively, any other predetermined conditional priority rules may be used for the network 316 that enables system 300 to function as described herein.

Accordingly, in an exemplary embodiment of system 100 for supplying current from at least one electrical supply 310 to at least one power storage device 106, first charging device 302 is configured to receive current from the electrical supply, and configured to supply current to first power storage device 106 of the plurality of power storage devices. At least one second charging device 304 is coupled to said first charging device 302 to form a network 316. The second charging device 304 is configured to receive current from the electrical supply 310, and configured to supply current to a second power storage device 106 of the plurality of power storage devices. The first charging device 302 comprises a first processor 204 programmed to determine a first charging parameter associated with said first charging device, determine whether the first charging device 302 possesses a network token 331, and if so, determine a second charging parameter associated with the second charging device 304, determine a second amount of current to be at least one of received from the electrical supply or supplied to the first power storage device 302, based at least in part on said determined first and said second charging parameters, and enable the determined second amount of current to be at least one of received by said first charging device 302 or supplied to the first power storage device 106.

Figure 4:
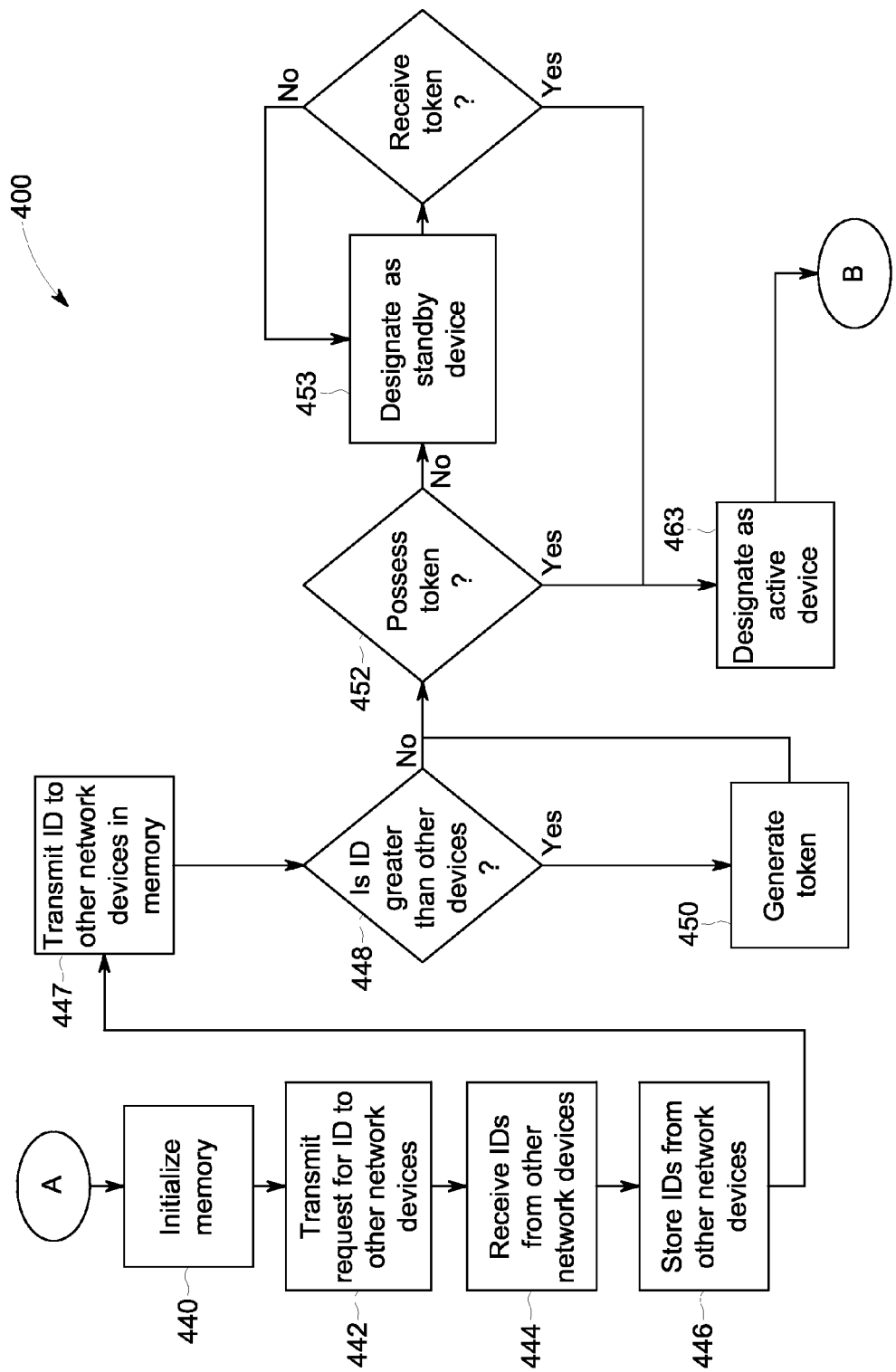
FIG. 4 is a flow diagram of an exemplary method of supplying current to a power storage device that may be used with the charging device shown in FIG. 2.

FIG. 4 is a flow diagram of an exemplary method 400 for supplying current to a power storage device, such as power storage device 106, that may be used with charging device 104 (both shown in FIG. 1). In an exemplary embodiment, method 400 is embodied within a plurality of instructions stored within memory device 204, and is at least partially executed by processor 202 (both shown in FIG. 2).

In an exemplary embodiment, a charging device 104, such as first charging device 302 (shown in FIG. 3), that is requested (e.g., by vehicle controller 110) to supply current to a power storage device 106 coupled thereto initializes 440 memory device 204.

At 442, a request for an ID (hereinafter referred to as an "ID request") is transmitted by first charging device 302 to at least one other charging device 104 within a network, such as network 316 (shown in FIG. 3). In an embodiment, first charging device 302 transmits 442 an ID request to each other charging device 104 within network 316 (such as second charging device 304, third charging device 306, and/or fourth charging device 308).

Thereafter, first charging device 302 receives 444 and stores 446 in its memory 204 the identification number (ID) data of the remaining charging devices 104 in the network 316. For example, in an embodiment, each charging device 104 receiving the ID request from first charging device 302 responds by transmitting ID data to first charging device 302. First charging device 302 receives 444 the ID data from each other charging device 104 within network 316 and stores 446 the received ID data.

In an embodiment, charging device 104 also transmits 447 its ID data to each of the remaining charging devices 104 in the network 316. For example, first charging device 302 transmits 447 its ID data to each other charging device 104 within network 316 (such as second charging device 304, third charging device 306, and/or fourth charging device 308).

Thereafter, in an embodiment, first charging device 302 in network 316 determines 448 if it should generate the network token 331. For example in an embodiment, first charging device 302 determines if its stored ID is greater than the stored ID of each of the remaining charging devices 104 in the network 316. If first charging device 302 determines 448 that its ID is greater than the stored ID of each of the remaining charging devices 104 in the network 316, then the charging device 302 generates 450 a network token 331.

If at 448 it is determined that the ID of first charging device 302 is not greater than the stored ID of any of the remaining charging devices 104 in the network 316, then charging device 302 determines 452 if it currently possesses the network token 331. If at 452 it is determined that first charging device 302 does not possess the network token 331, then it is designated 453 to be a present standby device.

If at 450 a network token 331 is generated by the first charging device 302, or if at 452 it is determined that the first charging device 302 is in possession of the network token 331, then at 463 the first charging device 302 is designated to be the present active device. In an embodiment, if a charging device 104 is designated to be the present active device, that is, in possession of the network token 331, then the charging device 104 is permitted to change any predetermined parameters, such as for example, a maximum current setting, a supply current, or a current usage.

Figure 5:
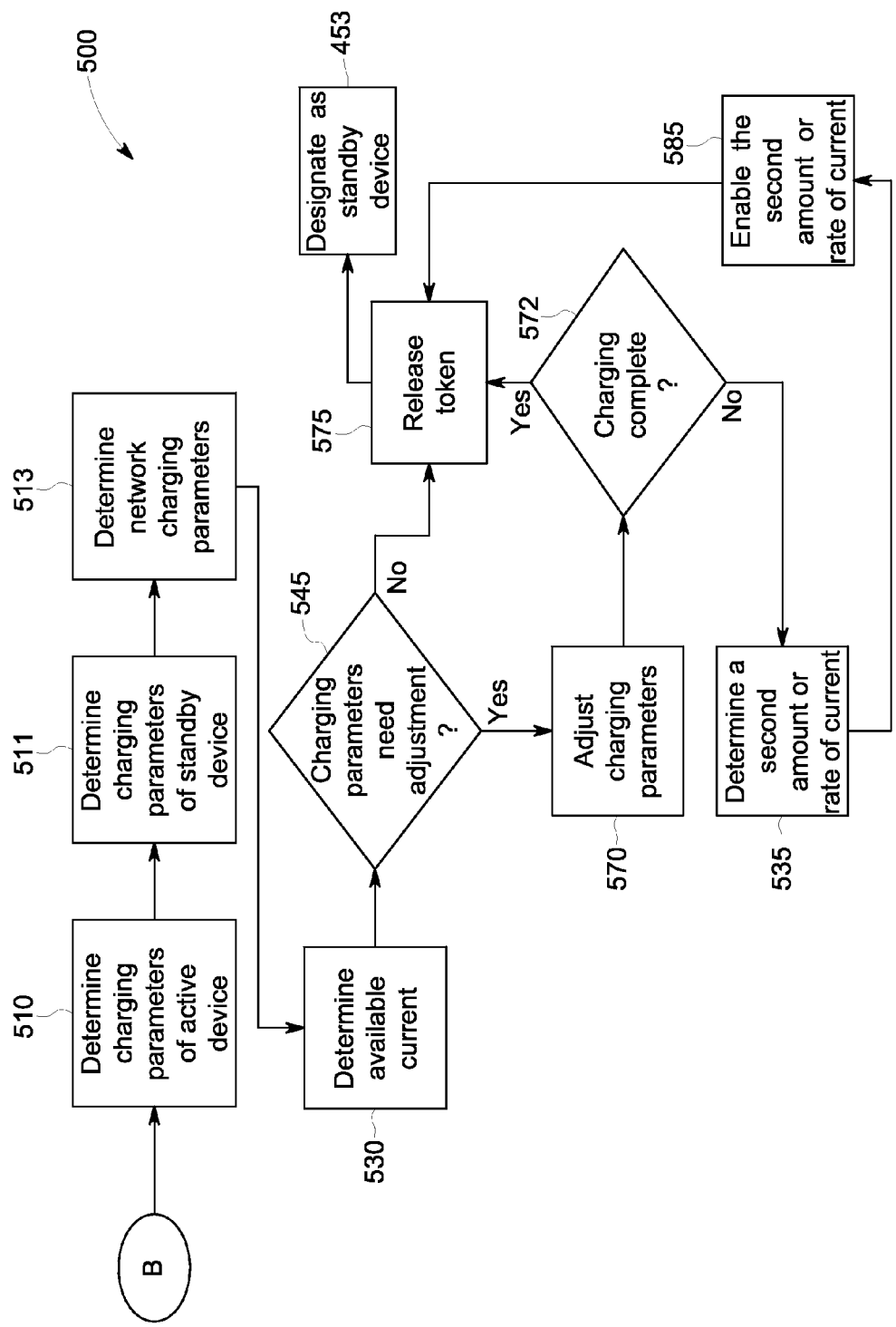
FIG. 5 is a flow diagram of an exemplary method of supplying current to a power storage device that may be used with the charging device shown in FIG. 2.
Figure 6:
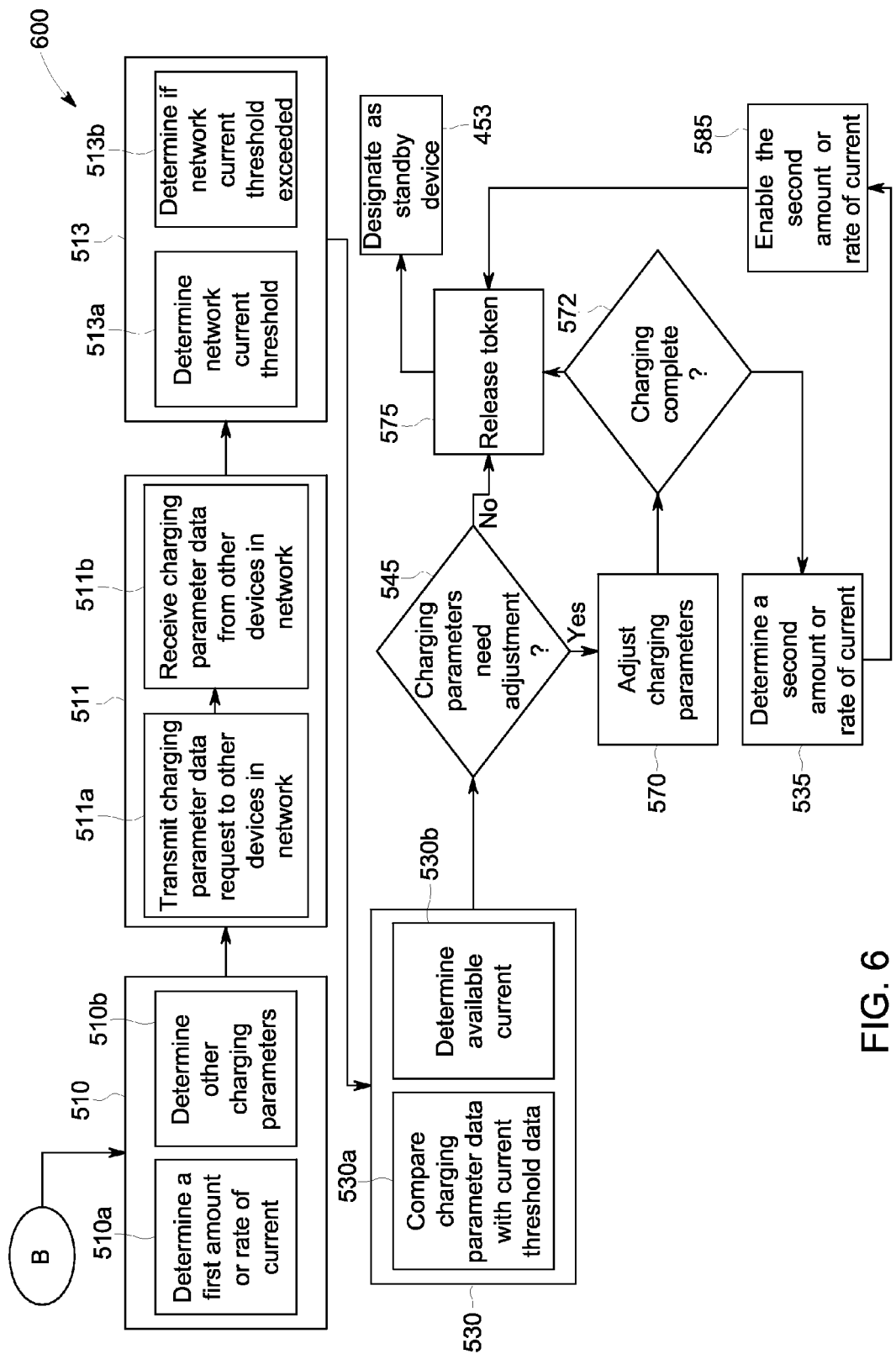
FIG. 6 is a flow diagram of an exemplary method of supplying current to a power storage device that may be used with the charging device shown in FIG. 2.

FIG. 5 and FIG. 6 are flow diagrams of exemplary methods 500, 600 for supplying current to a power storage device, such as power storage device 106, that may be used with charging device 104 (both shown in FIG. 1). In exemplary embodiments, any of methods 500 and 600 are embodied within a plurality of instructions stored within memory device 204, and is at least partially executed by processor 202 (both shown in FIG. 2).

Referring to FIG. 5, in an embodiment, when a charging device 104 possesses the network token 331, the active charging device 104 determines 510 at least a first charging parameter of the active charging device. For example, at 510a (FIG. 6), the determined charging parameters preferably include data indicative of a first amount or rate of current being at least one of received or supplied by the active charging device 104. In an embodiment, at 510b (FIG. 6) the determined first charging parameter may also comprise any other desired parameter, such as for example maximum current setting, charge duration, charging status, minimum current charging level, and conditional priority.

Thereafter, the active charging device 104 determines 511 at least a second charging parameter, such as for example the maximum current setting, current usage, supply current, charge duration, charging status or any other desired charging parameter of the remaining charging devices 104. In an embodiment, the active charging device 104 determines 511 the charging parameters of the remaining charging devices 104 stored in memory 204.

In another embodiment, when a charging device 302 possesses the network token 331, it determines 511 the charging parameters of the remaining charging devices 104 by transmitting 511a (FIG. 6) a charging parameter data request to the remaining charging devices 104 and receiving 511b (FIG. 6) the second charging parameter data from the remaining charging devices 104.

The active charging device 104 also determines 513 network charging parameter data, such as without limitation, a current threshold of the network, number of charging devices connected to network 316, or any other desired predetermined parameter. For example, at 513a (FIG. 6) a current threshold of the network is determined, and thereafter, at 513b (FIG. 6) it is determined whether the current threshold for the network is exceeded. In an embodiment, network charging parameter data may be stored in memory 204.

Thereafter, the active charging device 104 determines 530 an amount of current available (hereinafter the "available current") to be received from the electrical distribution device 310. The active charging device 104 determines 530 the available current based at least in part on the determined first, second, and network charging parameters.

In an embodiment, the active charging device 104 determines 530 the available current by comparing 530a (FIG. 6) the charging parameter data determined 510, 511 with the current threshold data for network 316 stored in memory 204. In an exemplary embodiment, the available current is equal to the current distribution limit of electrical distribution device 310 minus a sum of the current supplied (or expected to be supplied) to each charging device 104 (other than the active charging device 302) within network 316. For example, if the current distribution limit of electrical distribution device 310 is about 100 amperes, and three charging devices 104 (other than the requesting first charging device 302) are each drawing about 30 amperes of current from the electrical distribution device 310, the available current may be determined 530 to be about 10 amperes.

Thereafter, first charging device 302 determines 535 a second amount of current to at least one of draw from the electrical supply device 310 or supply to the first power storage device 106, based on the determined available current and/or the maximum current level. For example, in an embodiment, if the available current is greater than or equal to a minimum current charging level, first charging device 302 determines 535 the second amount of current to be about equal to the available current.

In an exemplary embodiment, the minimum current charging level is a predetermined minimum current level that power storage device 106 is designed to receive from charging device 104 and/or that charging device 104 is designed to supply to power storage device 106. In one embodiment, the minimum current charging level is about six amperes (A). Alternatively, the minimum current charging level may be any other value that enables methods 500 or 600 to function as described herein. If, however, the available current is less than the minimum current charging level, charging device 104 does not supply current to power storage device 106 until the available current increases to, or above, the minimum current charging level.

Thereafter, the presently designated active charging device 104, may also determine 545 if it should adjust any of its charging parameters. such as the maximum current setting based on predetermined parameters, such as at least one of the present charging parameters of the remaining charging devices 104 stored in memory 204, the determined network current threshold, the requested current, and the available current. If it is determined at 545 that adjustment of the predetermined parameters is required, then the parameters are adjusted 570 and stored in memory 204.

It is contemplated that in operation, the second determined current may comprise any determined value, including zero. Additionally, it is further contemplated that in operation, it may be determined 545 that no adjustment is required for one or more of the charging parameters. If it is determined 545 that no adjustment of charging parameters is required, then at 575 the designated active first charging device 302 releases the network token 331 to the second charging device.

Thereafter, first charging device 302 enables 585 the determined second current to flow. Specifically, in an embodiment, processor 202 controls or closes current control device 214 to enable that the determined second current is at least one of received by the first charging device 302 from the electrical supply 310 or supplied to power storage device 106.

First charging device 302 determines 572 whether the charging of power storage device 106 has completed (i.e., whether power storage device 106 has been charged to a desired level). If the charging has completed, method 500 or 600 ends and power storage device 106 may be decoupled from first charging device 302. Methods 500 or 600 may commence or resume when another power storage device 106 is coupled to first charging device 302 and/or when first charging device 302 receives a request to begin charging a power storage device 106 and is designated the present active device.

In an exemplary embodiment, a first charging device 302 determines 535 a second or revised amount of current to be at least one of received by the first charging device 302 from the electrical supply 310 or supplied to power storage device 106. In one embodiment, the second amount of current is determined 535 by dividing the current distribution limit by a number of charging devices 104 (including first charging device 302) within network 316. In an exemplary embodiment, the number of charging devices 104 is determined to be the number of charging devices 104 that are supplying current to a power storage device 106 and/or that are receiving current from distribution device 310. The number of charging devices 104 is determined based on the responses received 511*b* from other charging devices 104. In other embodiments, the number of charging devices 104 may additionally or alternatively be determined based on other predetermined criteria. For example, if the current distribution limit of electrical distribution device 310 is about 100 amperes and four charging devices 104 (including first charging device 302) are supplying current to one or more power storage devices 106, first charging device 302 determines 422 the second amount of current to be about 25 amperes. If the second amount of current is greater than the available current (i.e., the current distribution limit minus the sum of the current supplied from distribution device 310, or received by each other charging device 104), first charging device 302 reduces the second amount of current to the available current.

First charging device 302 enables 585 the second amount of current to flow, for example, by controlling or closing current control device 214. First charging device 302 determines 572 whether the charging of power storage device 106 has completed (i.e., whether power storage device 106 has been charged to a desired level). If the charging of power storage device 106 has completed, power storage device 106 may be decoupled from charging device 104. The method commences when another power storage device 106 is coupled to first charging device 302 and/or when first charging device 302 receives a request to begin charging a power storage device 106.

In an exemplary embodiment, each charging device 104 within network 316 determines an amount of current to draw from the distribution device 310. Through the determination 535 of the second amount of current, an embodiment prevents an overload on the electrical supply 310. As such, the current distribution limit of electrical distribution device 310 is not exceeded.

As described herein, a robust and effective charging device is provided. The charging device includes a processor configured to selectively activate a current control device to supply current to a power storage device of an electric vehicle. The charging device is coupled to at least one other charging device within a peer-to-peer network, and each charging device within the network is configured to receive current from a common electrical distribution device. When in possession of a network token, the charging device determines the charging parameters of the charging devices within the network that are supplying current to a power storage device. Each charging device within the network may draw current from a distribution device in an amount equal to or less than a current distribution limit of the electrical distribution device divided by the number of charging devices supplying and/or expecting to supply current to a power storage device. Accordingly, the current supplied by each charging device is substantially balanced or equalized and the charging devices are prevented from exceeding the current distribution limit of the electrical distribution device.

Exemplary embodiments of a system, a charging device, and a method of supplying current to a power storage device are described above in detail. The system, charging device, and method are not limited to the specific embodiments described herein, but rather, components of the system and/or charging device and/or steps of the method may be utilized independently and separately from other components and/or steps described herein. For example, the charging device may also be used in combination with other power systems and methods, and is not limited to practice with only the electric vehicle as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for use in supplying current from an electrical supply to a plurality of power storage devices, said system comprising:
   a first charging device configured to receive current from the electrical supply, and configured to supply current to a first power storage device of the plurality of power storage devices;
   a current control device coupled to said first charging device, configured to selectively enable a current to be at least one of received from the electrical supply or supplied to the first power storage device; and
   at least one second charging device coupled to said first charging device to form a network, said second charging device configured to receive current from the electrical supply, and configured to supply current to a second power storage device of the plurality of power storage devices;
   said first charging device comprising a first processor programmed to:
      determine a first charging parameter associated with said first charging device;
      determine whether said first charging device possesses a network token, and if so,
      determine a second charging parameter associated with said second charging device;
      determine a second amount of current to be at least one of received from the electrical supply or supplied to the first power storage device, based at least in part on said determined first and said second charging parameters; and
      enable the determined second amount of current to be at least one of received by said first charging device or supplied to the first power storage device.

2. The system of claim 1, wherein said first processor is further programmed to determine a third charging parameter associated with said network.

3. The system of claim 1, wherein when said second charging device is in possession of the network token, said first processor is further programmed to communicate said first charging parameter associated with said first charging device to said at least one second charging device in response to a second charging parameter data request received from said at least one second charging device.

4. The system of claim 1, wherein said first processor is programmed to enable the second amount of current if the second amount of current is equal to or greater than a predetermined minimum current threshold.

5. The system of claim 1, wherein said first charging device is configured to generate the network token.

6. The system of claim 1, wherein said first charging device is further configured to provide the network token to said second charging device after a predetermined period.

7. The system of claim 1, wherein said first charging parameter associated with said first charging device comprises a first amount of current being at least one of received or supplied by said first charging device.

8. A charging device for charging a power storage device, the charging device comprising:
    a current control device configured to selectively enable a current to be at least one of received from the electrical supply or supplied to the power storage device;
    a network interface configured to couple to at least one second charging device to form a network; and
    a processor coupled to said current control device and programmed to:
        determine a first charging parameter associated with said charging device;
        determine whether said charging device possesses a network token, and if so,
        determine a second charging parameter associated with said second charging device;
        determine a second amount of current to be at least one of received from the electrical supply or supplied to the power storage device, based at least in part on said determined first and second charging parameters; and
        enable the determined second amount of current to be at least one of received by said charging device or supplied to the first power storage device.

9. The charging device of claim 8, wherein said charging device is configured to be coupled to an electrical distribution device, and further configured to supply current from the electrical distribution device to the power storage device.

10. The charging device of claim 9, wherein when said charging device possess the network token, said first processor is further programmed to transmit a first charging parameter data request to said at least one second charging device, and to receive the charging parameter data from said at least one second charging device.

11. The charging device of claim 10, wherein said first processor is further programmed to communicate the first charging parameter data associated with said charging device to said at least one second charging device in response to a second charging parameter data request from said at least one second charging device, when said second charging device is in possession of the network token.

12. The charging device of claim 10, wherein said first processor is further programmed to enable the second amount of current if the second amount of current is equal to or greater than a predetermined minimum current threshold.

13. The charging device of claim 10, wherein said first charging parameter associated with said charging device comprises a first amount of current being at least one of received or supplied by said charging device.

14. The charging device of claim 10, wherein said processor is further programmed to determine said second amount of current to be supplied by dividing a current distribution limit of the electrical distribution device by a number of charging devices within the network.

15. A method of supplying current to a power storage device, said method comprising:
    configuring at least a first charging device and a second power device number within a network, wherein the first charging device includes a current control device configured to selectively enable a current to be at least one of received from the electrical supply or supplied to the power storage device;
    determining whether said first charging device possesses a network token, and if so,
    determining a first charging parameter associated with said first charging device;
    determining a second charging parameter associated with said second charging device;
    determining a second amount of current to be at least one of received from the electrical supply or supplied to the first power storage device, based at least in part on said determined first and said second charging parameters; and
    enabling the determined second amount of current to be at least one of received by said first charging device or supplied to the first power storage device.

16. The method of claim 15, wherein said determining a second charging parameter associated with said second charging device comprises transmitting a first charging parameter data request to said at least one second charging device, and receiving the charging parameter data from said at least one second charging device.

17. The method of claim 16, wherein said first charging parameter associated with said first charging device comprises a first amount of current being at least one of received or supplied by said first charging device.

18. The method of claim 15, further comprising providing the network token to said second charging device after a predetermined period.

19. The method of claim 18, further comprising: providing the network token to said second charging device after a predetermined period; and communicating said first charging parameter data associated with said first charging device to said at least one second charging device in response to a second charging parameter data request from said at least one second charging device, when said second charging device is in possession of the network token.

* * * * *

UNITED STATES PATENT AND TRADEMARK OFFICE
CERTIFICATE OF CORRECTION

PATENT NO. : 8,358,102 B2
APPLICATION NO. : 13/278303
DATED : January 22, 2013
INVENTOR(S) : Rivers, Jr. et al.

It is certified that error appears in the above-identified patent and that said Letters Patent is hereby corrected as shown below:

In the Specifications

In Column 2, Line 12, delete "vehicle." and insert -- vehicle; --, therefor.

In Column 12, Line 28, delete "parameters." and insert -- parameters, --, therefor.

Signed and Sealed this
Fourteenth Day of May, 2013

Teresa Stanek Rea
*Acting Director of the United States Patent and Trademark Office*